United States Patent [19]
Ludwig

[11] 3,767,212
[45] Oct. 23, 1973

[54] SPIRAL GROOVE SEAL
[75] Inventor: Lawrence P. Ludwig, Fairview Park, Ohio
[73] Assignee: The United States of America as represented by the Administrator of the National Aeronautics and Space Administration, Washington, D.C.
[22] Filed: Dec. 21, 1970
[21] Appl. No.: 99,901

Related U.S. Application Data
[63] Continuation of Ser. No. 723,465, April 23, 1968, abandoned.

[52] U.S. Cl. .................. 277/25, 277/27, 277/96
[51] Int. Cl. ............................................ F16j 15/34
[58] Field of Search ............... 277/3, 27, 96, 74, 277/88, 134, 133, 25

[56] References Cited
UNITED STATES PATENTS
2,354,478   7/1944   Reinhardt et al. ............... 277/88 X
3,109,658   11/1963  Barrett et al. .................... 277/96 X
3,499,653   3/1970   Gardner ........................... 277/96 X
3,527,465   9/1970   Guinard ........................... 277/96 X FOREIGN PATENTS OR APPLICATIONS
1,009,940   11/1965  Great Britain ..................... 277/74
  230,697    3/1925  Great Britain ..................... 277/88

OTHER PUBLICATIONS
Mechanical Engineering– "Dynamic Seal Technology" pages 28–33 (see page 30 Fig. 2 left). March 1968

Primary Examiner—Samuel B. Rothberg
Attorney—N. T. Musial, G. E. Shook and John R. Manning

[57] ABSTRACT

Mating flat surfaces inhibit leakage of a fluid around a stationary shaft. A spiral groove pattern produces a pumping action toward the fluid when the shaft rotates which prevents leakage while a generated hydraulic lifting force separates the mating surfaces to minimize wear.

5 Claims, 3 Drawing Figures

Patented Oct. 23, 1973

3,767,212

INVENTOR
LAWRENCE P. LUDWIG

BY Norman T. Musial
Gene E. Shook

ATTORNEYS

SPIRAL GROOVE SEAL

RELATED INVENTION

This application is a continuation of copending application Ser. No. 723,465 which was filed Apr. 23, 1968, and now abandoned.

OWNERSHIP

The invention described herein was made by an employee of the United States Government and may be manufactured and used by or for the Government for governmental purposes without the payment of any royalties thereon or therefor.

BACKGROUND

This invention is concerned with sealing a rotating shaft with a minimum amount of wear. The invention is particularly directed to a low leakage shaft seal which can be used with many types of liquids, such as water, sodium, and oil.

Helical groove viscoseals and face contact seals have been used with rotating shafts. Leakage has been encountered with both types of seals. When a shaft having a viscoseal stops rotating the seal ceases to function. Leakage results from a lack of positive pumping action in a radial contact face seal.

Other problems encountered in sealing rotating shafts in modern devices are the result of high liquid temperatures, limited weight requirements, and extremely low leakage rate allowances. Many such devices require a high degree of reliability over long periods of unattended operation.

SUMMARY

The aforementioned problems have been solved by using a rotating seal seat in conjunction with a spiral groove pattern arranged such that movement of the seal seat causes the grooves to produce a pumping action against the sealed fluid pressure. Fluid is pumped back as fast as it leaks out. The spiral groove geometry pattern provides a hydrodynamic lifting force which produces a positive separation of radial sealing surfaces when the shaft rotates. Engagement of these surfaces prevents leakage when the shaft is stationary, and separation of these surfaces when the shaft is rotating reduces wear.

OBJECTS

It is, therefor, an object of the present invention to provide a low leakage seal having a long operating life.

Another object of the invention is to provide positive contact sealing at static conditions when there is no rotation or movement.

A further object of the invention is to provide a seal having positive separation of the sealing surfaces in the operating mode.

These and other objects and advantages of the invention will be apparent from the specification that follows and from the drawing wherein like numerals are used throughout to identify like parts.

DRAWINGS

DESCRIPTION

Figure 1:
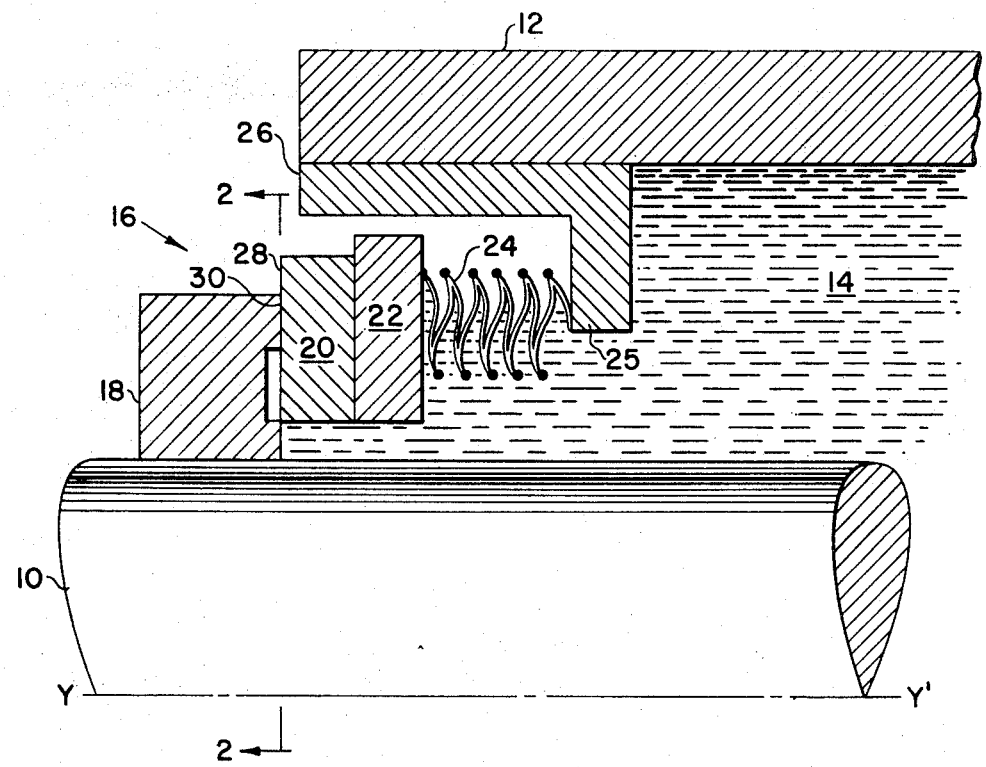
FIG. 1 is an axial quarter section of a seal constructed in accordance with the present invention showing the relative position of the various parts when the shaft is stationary.

In the embodiment shown in FIG. 1 a shaft 10 extends into a container 12 of liquid 14. The shaft 10 is rotatable about its normal axis Y-Y' and may be used to transmit torque from motor to a pump. The liquid 14 may be an alkali metal, such as sodium, at a high temperature. Loss of the liquid 14 from the container 12 is prevented by a seal 16 constructed in accordance with the present invention.

The seal 16 incorporates a rotatable seat 18 in the form of a shoulder on the shaft 10. The seal 16 further includes a nosepiece 20 in the form of a ring member through which the shaft 10 extends. The nosepiece 20 is mounted on a sleeve 22 which is secured to one end of a bellows 24. The opposite end of the bellows 24 is attached to a flange 25 on a tubular housing 26 that is secured to the container 12. The bellows 24 prevents the rotation of the sleeve 22 while biasing the nosepiece 20 towards the seat 18. The bellows 24 provides a mechanical spring force and functions as a secondary seal to accomodate axial motion of the sleeve 22.

The nosepiece 20 has a radially extending surface 28 and the seat 18 has a mating surface 30 which extends inwardly from its periphery. The surfaces 28 and 30 are maintained in sealing engagement by the biasing action of the bellows spring force and by hydraulic pressure when the shaft 10 is stationary as shown in FIG. 1. The dam formed by the sealing engagement of the surfaces 28 and 30 prevents leakage of the liquid 14, and these surfaces are preferably optically flat for best results.

Figure 2:
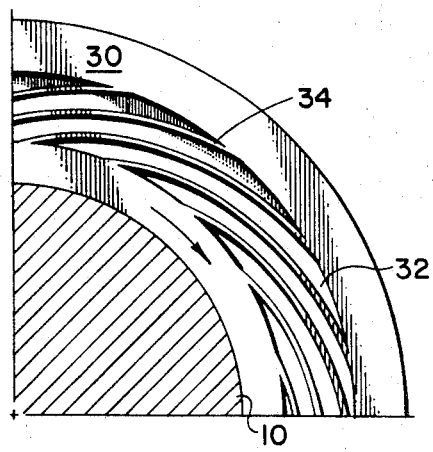
FIG. 2 is an elevation view of the rotatable seat taken along the line 2—2 in FIG. 1.

A plurality of grooves 32 are chemically etched into the seat 18. The grooves 32 have a spiral configuration as shown in FIG. 2 and are separated by lands 34 that are coplanar with the sealing surface 30. By way of example, spiral grooves 32 having a depth of 0.0015 inch an an average width of 0.05 inch separated by 0.021 inch wide lands 34 were used in the seals listed in Table 1.

Figure 3:
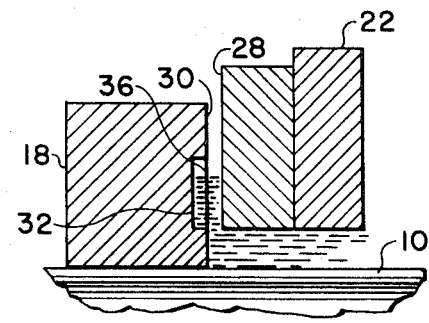
FIG. 3 is a partial sectional view showing the relative positions of certain parts of the seal when the shaft is rotating.

Rotation of the shaft 10 in the direction of the arrow shown in FIG. 2 produces a pumping action by the spiral grooves 32. This pumping is accompanied by a hydraulic lifting force at the lands 34 which moves the surfaces 28 and 30 out of engagement thereby forming a gap shown in FIG. 3. This hydraulic lifting force maintains the gap between the surfaces 28 and 30 while the pumping prevents leakage of the liquid 14. A liquid-gas interface 36 shown in FIG. 3 is formed between the seat 18 and the nosepiece 20.

It may be desirable to have the liquid located outside the bellows 24. In this embodiment the position of the dam and the spiral grooves is reversed from that shown in FIG. 1. More particularly, the dam formed by the engagement of the surfaces 28 and 30 is located inward from the spiral grooves 32. The prevention of leakage is further aided by centrifugal force. In both the embodiments the spiral grooves are on the high pressure side of the dam for best results.

It may also be desirable to form the spiral grooves in the axially movable nosepiece instead of in the rotatable seat. In such an embodiment the grooves would have a configuration that would pump toward the liquid in the container. It is further contemplated that grooves may be used simultaneously on both the seat and the nosepiece.

Seals constructed in accordance with the invention were used to seal a rotating shaft that extended into a container of liquid sodium. The enclosure was pressurized slightly above the ambient pressure with argon to insure an inert environment around the containment vessel. Flatness of the seal seat and nosepiece was held with one light band.

TABLE I

| Run | 1 | 2 | |
|---|---|---|---|
| Nosepiece material | Copper | Copper | |
| Seal seat material | Titanium Carbide | Molybdenum | |
| Location of spiral groove | Nosepiece | Seal | Seat |
| Sodium temperature °F | 375° | 425 | 500 |
| Sodium temperature °C | 190° | 218 | 260 |
| Sliding velocity ft/sec | 30 | 48 | 64 |
| Sliding velocity m/sec | 9.1 | 15 | 20 |
| Operating time, hr. | 4.0 | 7.0 | 2.0 |
| Surface condition after run | | Good | Excellent |

Table 1 lists the leakage results and operating conditions for several seals constructed in accordance with the invention. The first seal had a copper nosepiece with spiral grooves and a seal seat of titanium carbide. This seal operated in liquid sodium for four hours at 20 pounds per square inch gage (14 N/cm² gage) with leakage less than the estimated detection limit of 0.02 cubic inch per hour (0.30 cm³/hr). Inspection of the sealing services revealed several local wear areas on the copper nosepiece, but the major portion of the surface showed no evidence of rubbing contact.

Another seal used in Run 2 had a plain copper nosepiece and a molybdenum spiral-groove seal seat. This combination was operated for nine hours at various speeds and at a sodium pressure of 20 pounds per square inch gage (14 N/cm² gage) with negligible leakage. Visual observation of the seal below 64 feet per second (20 m/sec.) indicated leakage of intermittent minute drops of liquid sodium which oxidized into small pepper-size flakes. This visual observation required the opening of the enclosure, and some oxygen was present around the seal area during inspection. Above 64 feet per second (20 m/sec.) these drops could not be observed. Sealing surfaces were in excellent condition after nine hours of operation which indicated that rubbing contact had occurred over most of the surface. This rubbing contact probably occurred at start up. Before start up, this seal showed no leakage which indicated good contact and flatness at the sealing surfaces. At shut down, the seal showed a slight leakage of 0.02 cubic inches per hour (0.3 cm³/hr.) at zero rotation which indicated some change in the surface flatness had occurred.

Spiral grooves were also incorporated into carbide seal seats which were mated to carbide nosepieces in another test. The leakage results were similar to those shown in Table 1, and sliding surfaces were in excellent condition after several hours of operation at 500°F (260°C) in liquid sodium.

While several embodiments of the invention have been disclosed and described it will be appreciated that various structural modifications may be made without departing from the spirit of the invention or the scope of the subjoined claims.

What is claimed is:

1. Apparatus for forming a seal about a rotatable shaft extending into a container of liquid sodium comprising a pair of juxtaposed members extending about said shaft adjacent said liquid, one of said members comprising a seat mounted on said shaft for rotation therewith, said seat being of a material selected from the group consisting of titanium carbide and molybdenum, a copper tubular member mounted for reciprocable movement along said shaft, mating surfaces on said members, one edge of each of said surfaces being in contact with said liquid sodium and the opposite edge being exposed to ambient pressure, biasing means for moving said tubular member toward said seat thereby moving said surfaces into sealing engagement when said shaft is stationary, and spiral grooves on at least one of said mating surfaces immediately adjacent said liquid, said spiral grooves being separated by lands substantially coplanar with said mating surface whereby rotation of the said shaft pumps a portion of said adjacent contained liquid sodium between said lands to generate a hydraulic lifting force thereby separating said members in opposition to said biasing means while inhibiting leakage.

2. Apparatus for forming a fluid seal about a rotatable shaft as claimed in claim 1 wherein the mating surfaces are substantially parallel and normal to the axis of rotation of said shaft.

3. Apparatus for forming a fluid seal about a rotatable shaft as claimed in claim 1 wherein the grooves are formed on the shoulder on said shaft adjacent said contained liquid.

4. Apparatus for forming a fluid seal about a rotatable shaft as claimed in claim 1 wherein the grooves are formed on the ring adjacent said contained liquid.

5. Apparatus for forming a fluid seal about a rotatable shaft as claimed in claim 1 wherein the biasing means comprises a bellows operably connected to said ring.

* * * * *